United States Patent [19]
Fromm

[11] Patent Number: 5,501,145
[45] Date of Patent: Mar. 26, 1996

[54] MULTI-PURPOSE CALENDAR

[75] Inventor: Gerald Fromm, Wedemark, Germany

[73] Assignee: Paul Troester Maschinenfabrik, Hanover, Germany

[21] Appl. No.: 235,288

[22] Filed: Apr. 29, 1994

[30] Foreign Application Priority Data

May 4, 1993 [DE] Germany .......................... 43 14 653.8

[51] Int. Cl.⁶ .................................................... D21G 1/00
[52] U.S. Cl. ................................. 100/158 R; 100/163 R; 425/366
[58] Field of Search ................................ 100/158 R, 161, 100/162 R, 163 R, 163 A, 164, 165, 168–170, 172; 425/366, 367

[56] References Cited

U.S. PATENT DOCUMENTS

| | | | |
|---|---|---|---|
| 2,965,920 | 12/1960 | Whittum | 100/158 R |
| 3,273,199 | 9/1966 | Kleinwefers | 100/158 R |
| 3,653,320 | 4/1972 | Oehlmann et al. | 100/158 R |
| 4,348,952 | 9/1982 | Gooch | 100/158 R |
| 4,516,491 | 5/1985 | Winter | 100/158 R |

FOREIGN PATENT DOCUMENTS

| | | | |
|---|---|---|---|
| 58-157504 | 9/1983 | Japan | 100/158 R |
| 638290 | 6/1950 | United Kingdom | 100/158 R |

*Primary Examiner*—Stephen F. Gerrity
*Attorney, Agent, or Firm*—Emmanuel J. Lobato

[57] ABSTRACT

A multi-purpose calender having latterly spaced frames mounting four superposed calender rolls with their axes of rotation extending horizontally and three rolls offset relative to a vertical plane. Two outer rolls are provided with two coactive inner rolls intermediate the outer rolls. A first inner roll is mounted with an axis of rotation fixed in a vertical and in a horizontal plane. The frames have slot guides therein mounting beating housings and the bearings therein of the three other rolls adjustably shiftable and crossable independently along respective inclined planes.

10 Claims, 9 Drawing Sheets

MULTI-PURPOSE CALENDAR

BACKGROUND OF THE INVENTION

The invention relates to a calender, in the frames of which are mounted two outer rolls offset relative to each other in superposition and at least two inner rolls disposed between the two outer rolls. The two outer rolls are capable of roll crossing by adjusting means and shiftable by additional adjusting means. One inner roll is mounted fixed in the calender frames, while the other inner roll is shiftable by adjusting means for setting the roll gap width. The bearing housings of the shiftable inner roll are slidable in slot type guides of the calender frames. The adjusting means engage the bearing housings of the outer crossable, shiftable rolls acting in directions perpendicular to each other.

A calender is known in a simplified form of realization through German Patent DE-PS 19 15 261. In it the roll axes are arranged in superposition in a vertical plane. This known calender serves for bilateral coating of a fabric with a rubber layer. To be able to sufficiently vary the gap width of the roll gap in the center of the four rolls, into which gap both the fabric and the two coatings enter, without losing the possibility of crossing the outer rolls, one of the two inner rolls is mounted fixed in the calender frames, while the other inner roll and the outer roll associated with it are mounted in large and very heavy sliding blocks which are mounted, for sliding displacement by a motor, in the calender frames. In each sliding block, an additional sliding block is mounted, for sliding displacement by motor force, in which is mounted the outer roll associated with the shiftable inner roll. Due to the two sliding blocks, the manufacture of this calender is very expensive and complex.

Another known calender is similarly constructed and operates in a same manner. It also is equipped with two sliding blocks, and has become well known. The roll axes of this known calender are also arranged in superposition, but not in a vertical plane. The roll axes are disposed in pairs in two planes extending at an acute angle relative to the vertical. This calender has the same disadvantages of a high cost of construction and high manufacturing and installation costs because of the two very heavy sliding blocks. But not only are the heavy sliding blocks disadvantageous; their existence entails the requirement that the calender frames also must be made very much heavier than normal for four-roll calenders. That in turn entails a need for sturdier and more expensive foundations as well as the need to use stronger transport means and heavy hoisting apparatus for erection.

SUMMARY OF THE INVENTION

The present invention avoids the several disadvantages of the prior art. It is an object of the invention to provide, by simple construction and in a simple arrangement, a universally usable calender which likewise is suitable and intended for bilateral coating of a material strip, e.g., a fabric, with a rubber layer of small or thin to large thicknesses, but which due to the elimination of the large sliding blocks is less expensive to buy, lighter in weight, and easier to operate.

The invention consists in a parallel arrangement of the displacement direction of a shiftable central or inner roll relative to the displacement direction of a shiftable and crossable outer roll associated with it and in the possibility of shifting this outer roll, over and above the possibility of crossing, by the path of excursion, and the direction of the displacement of the movable inner roll by at least a distance necessary for the coating of the fabric strip, of the adjustable inner roll from the associated inner fixed axis roll.

This calender can execute the necessary roll adjustments without the use of heavy sliding blocks supporting the two of four rolls, even for products of considerable thickness. Due to the elimination of the sliding blocks and because the frames can be of lighter construction, the weight and the primary costs of the entire calender can be reduced considerably.

It is a special advantage of this calender that it is usable as a multi-purpose calender, i.e., it is usable both for calendering a strip type product in three gaps and for the doubling of two fabric strips as well as for unilateral and bilateral coating or backing of a fabric strip, and also for the production of foils and strips.

For easily handling or operating this calender it is advantageous to provide a control device with two control possibilities for equal and preferably also uniform displacement of the two bearing housings of the outer roll associated with the shiftable central roll.

One possibility is that of displacement of one bearing housing in a counter-direction to the displacement of the other bearing housing by equal path lengths for roll crossing and an additional possibility is that of displacement of both bearing housings of this one outer roll in the same direction by equal path lengths for parallel roll displacement.

A simplified design of this calender can be achieved by the fact that the guides, arranged in the calender frames, for the supports of the bearing housing of the outer roll adjacent to the shiftable inner roll extend perpendicular to the guides of the shiftable inner roll; that the displacement direction of this outer roll for the crossing thereof extends parallel to the guide of the shiftable inner roll, the guides are arranged at an acute angle to the horizontal and vertical; and that the displacement possibility parallel to the guide of the inner shiftable roll is laid out farther than necessary for the crossing, that is, also for an additional roll displacement parallel to itself, namely so far that the distance, necessary for the coating of the fabric strip, of the inner adjustable roll from the inner fixed roll is settable. In addition, for emergency opening of the gap, an extra stroke is provided at the adjustable inner roll.

This calender can be realized in several forms or embodiments.

One possible form of realization consists in that the bearing housings of the crossing and shiftable roll slide are disposed in slot type guides of supports which in turn slide in slot type guides. The guides in the supports extend perpendicular to the guides in the calender frames.

Another form of realization, requiring less space, consists in that the adjusting devices, acting parallel to the guides of the inner shiftable roll, for the bearing housings of the outer roll adjacent to it are secured in the calender frames and clamp the bearing housings between them.

For operation of the calender, in particular when setting it up for the manufacture of a product, it is advantageous to provide a control device by which the two adjacent roll bearing housings displaceable in their parallel extending guides are displaceable simultaneously and parallel and the individual operating positions of the rolls are reproducible.

In the construction according to the invention it is actually desirable that the guides in the supports are longer than the guides in the calender frames parallel to them. However, for emergency opening of the gap it must be possible to displace the shiftable inner roll so that that in actual practice its guides are longer.

For the construction of this calender it is desirable if the axis of the movable central or inner roll is settable in an inclined plane in such a way that in its end position it lies in the vertical plane passing through the axis of the fixed central roll, while the axes of the outer rolls and of the central or inner rolls adjacent to them are arranged each in a respective inclined plane extending at an acute angle to the vertical.

BRIEF DESCRIPTION OF THE DRAWING

The essence of the invention will be explained more specifically below with reference to examples of embodiments illustrated schematically in the drawings, in which.

DESCRIPTION OF THE PREFERRED EMBODIMENTS

Figure 1:
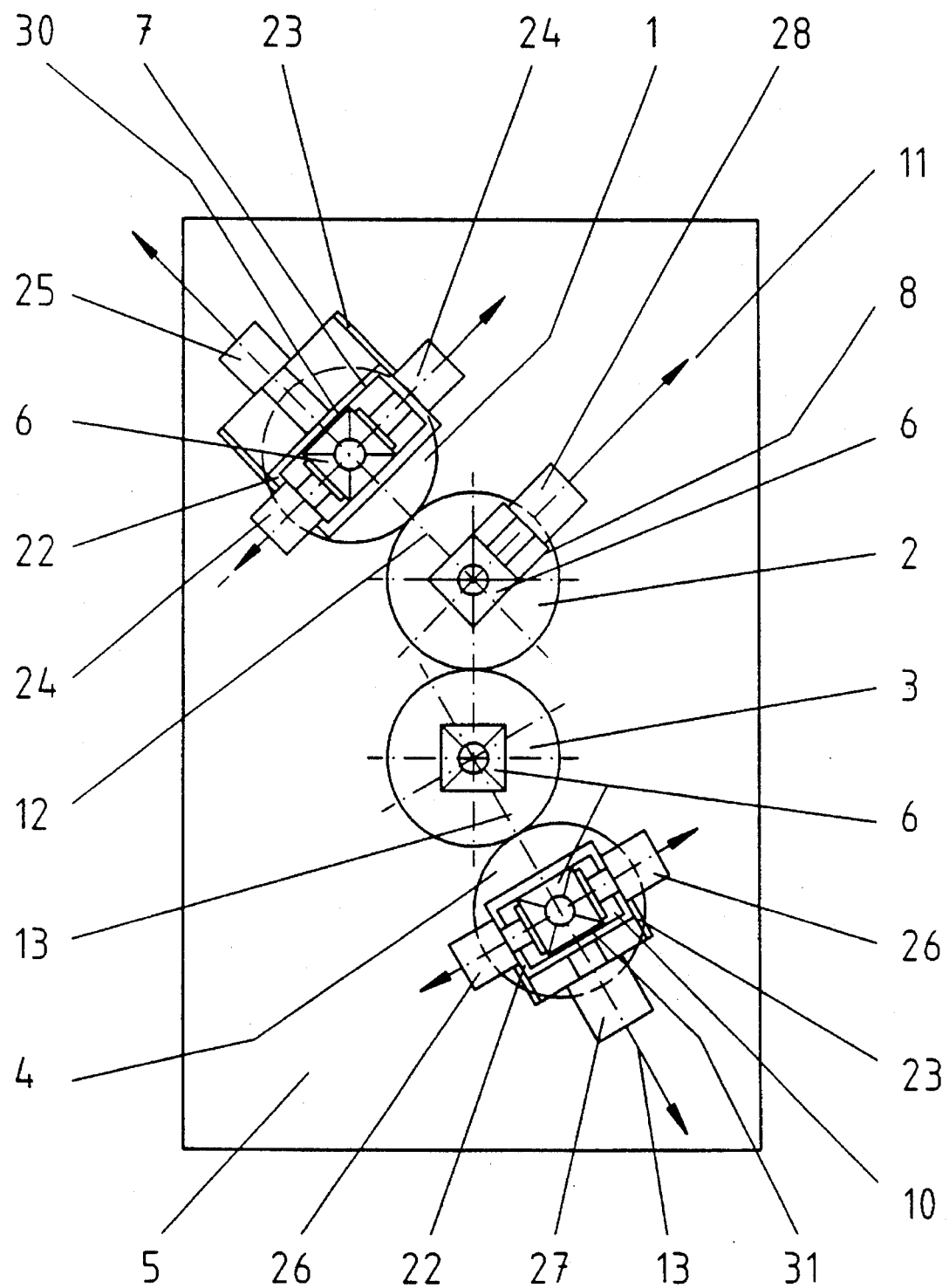
FIG. 1 illustrates the construction of the calender.

FIG. 1 of the drawing shows one end of a calender having oppositely disposed calender frames 5 laterally spaced from each other, mounting two outer rolls 1, 4 in superposition and two inner rolls 2, 3 disposed in the center between the two outer rolls 1, 4 are mounted offset relative to each other and associated rolls. The two outer rolls 1, 4 are capable of crossing by adjusting means 24, 26 and shiftable by additional adjusting means 25, 27. One inner roll 3 is mounted fixed, in horizontal and vertical planes, in the calender frames 5, while the other inner roll 2 is shiftable by adjusting means 28. The bearing housings 6 of the shiftable inner roll 2 slide in slot type guides 8 of the calender frames 5 and the bearing housings 6 of the outer crossable and shiftable rolls 1, 4 slide in slot type guides 7, 10 of supports 22, which in turn slide in slot type guides 23 in the calender frames 5. The guides 23 of the supports 22, provided in both frames 5 of the calender, are disposed perpendicular to the guides 7, 10 within the supports 22.

It is essential for the invention that the guides 23 disposed in the calender frames 5 for the supports 22 of the bearing housings 6 of the outer roll 1 adjacent to the shiftable inner roll 2 are perpendicular to guide 8 of the shiftable inner roll 2, and that the guide 23 in the support 22 associated with this outer roll 1 is parallel to guide 8 of the shiftable inner roll. The guides 7, 8, 23 are disposed at an acute angle to the horizontal and to the vertical. The guides 7, 36 extending parallel to guide 8 of the inner shiftable roll 2 and disposed at the supports 22 are of such length that the distance or gap of the inner adjustable roll 2 from the inner fixed roll 3 required for coating the web or sheet 9 or respectively 18 and the crossing are settable.

The adjusting means used are spindles and/or controlled hydraulic piston-cylinder units that carry out the displacements of bearing housings and crossing to properly adjustably position the rolls for carrying out the various possible operations of the calender according to the invention, and to obtain uniformly thick products.

The slot type guides 7 in the supports 22 and 8 in the calender frames for the bearing housings 6 of this one pair of shiftable adjacent rolls 1, 2 extend parallel to each other at an acute angle to the horizontal and to the vertical. The guide is of such length that the distance of the inner adjustable roll 2 from the inner fixed roll 3 necessary for coating the webs, sheets, fabric and the like 9 or 18 is settable and the necessary roll gap in emergency mode is ensured.

Further it is advantageous to provide a control device by which the two adjacent rolls 1, 2 sliding in the two oblique guides 7, 8 are displaceable simultaneously and in parallel.

The bearing housings 6 of the outer roll 4 slide in guides 10, the direction of which need not be parallel to the guides 7, 8.

In this calender, the axis of the central roll 2 is adjustable in an inclined plane 11, namely up to a vertical plane through the axis of the fixed roll 3. The axes of the outer rolls 1, 4 and of the central roll 2 adjacent to the outer roll 1 are arranged in inclined planes 12, 13 extending defining an acute angle to the vertical.

Figure 2:
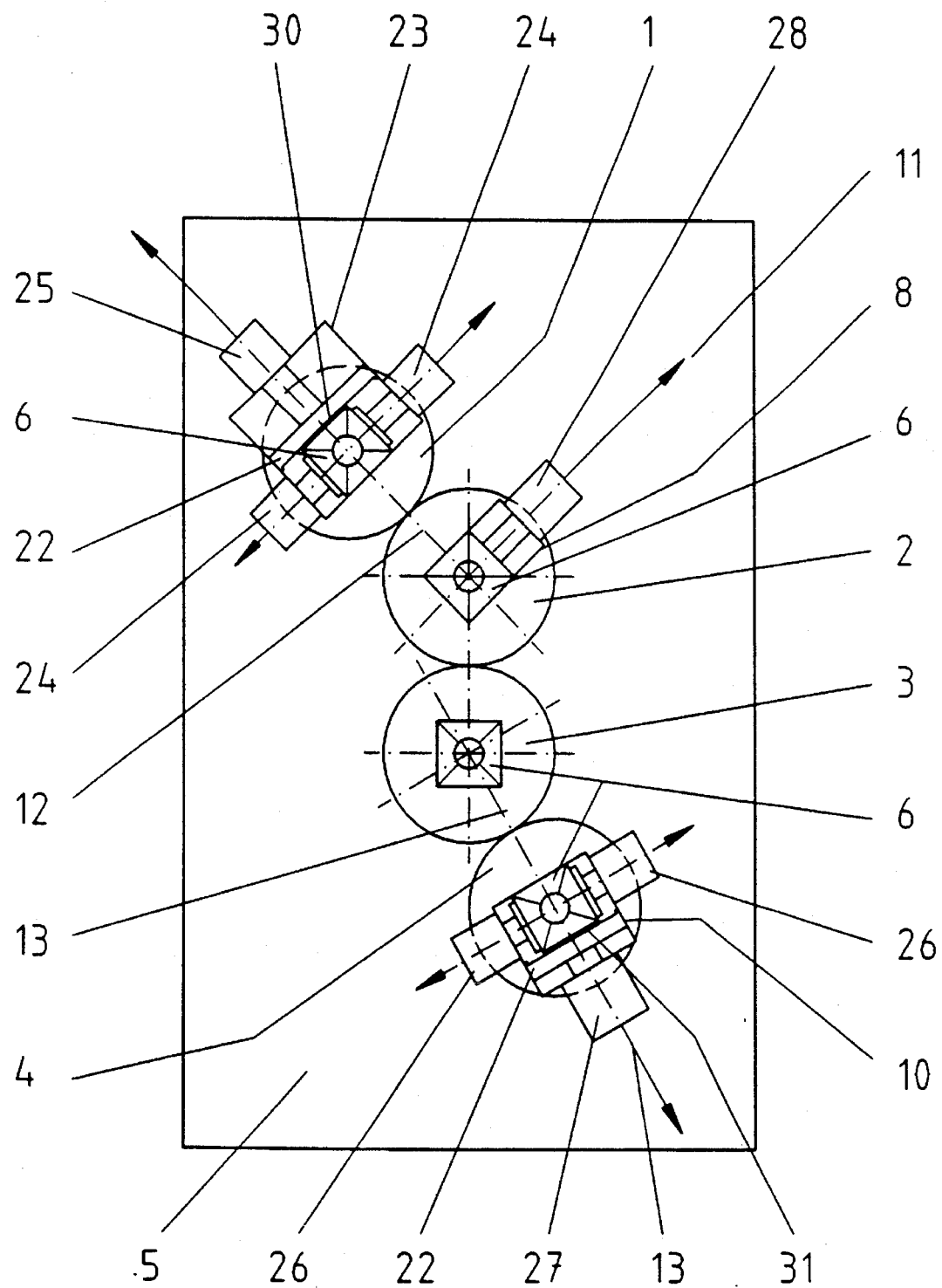
FIG. 2 illustrates another calender embodiment with a simpler bearing displaceability.
Figure 3:
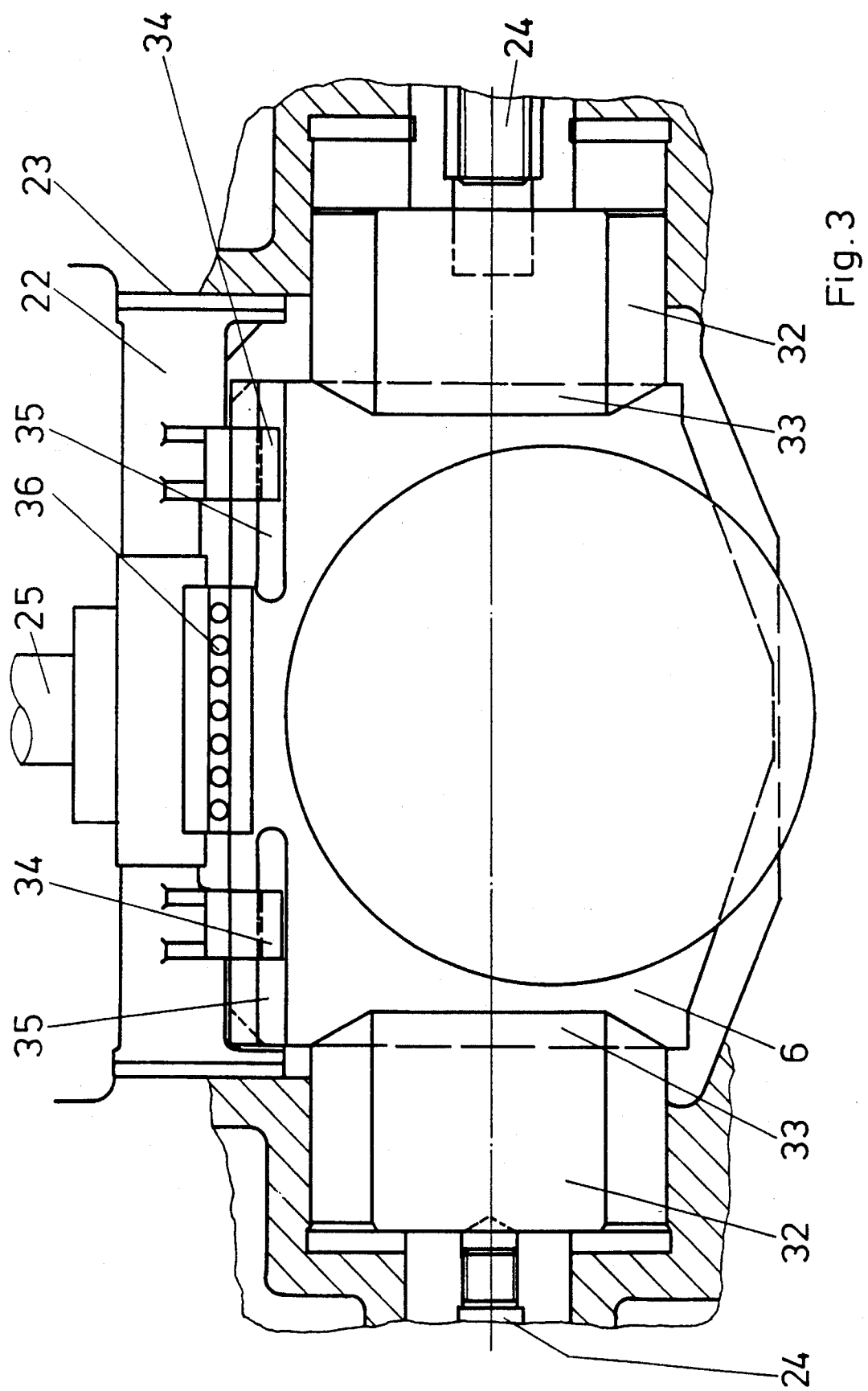
FIG. 3 illustrates the crossing and shifting device of this calender.
Figure 4:
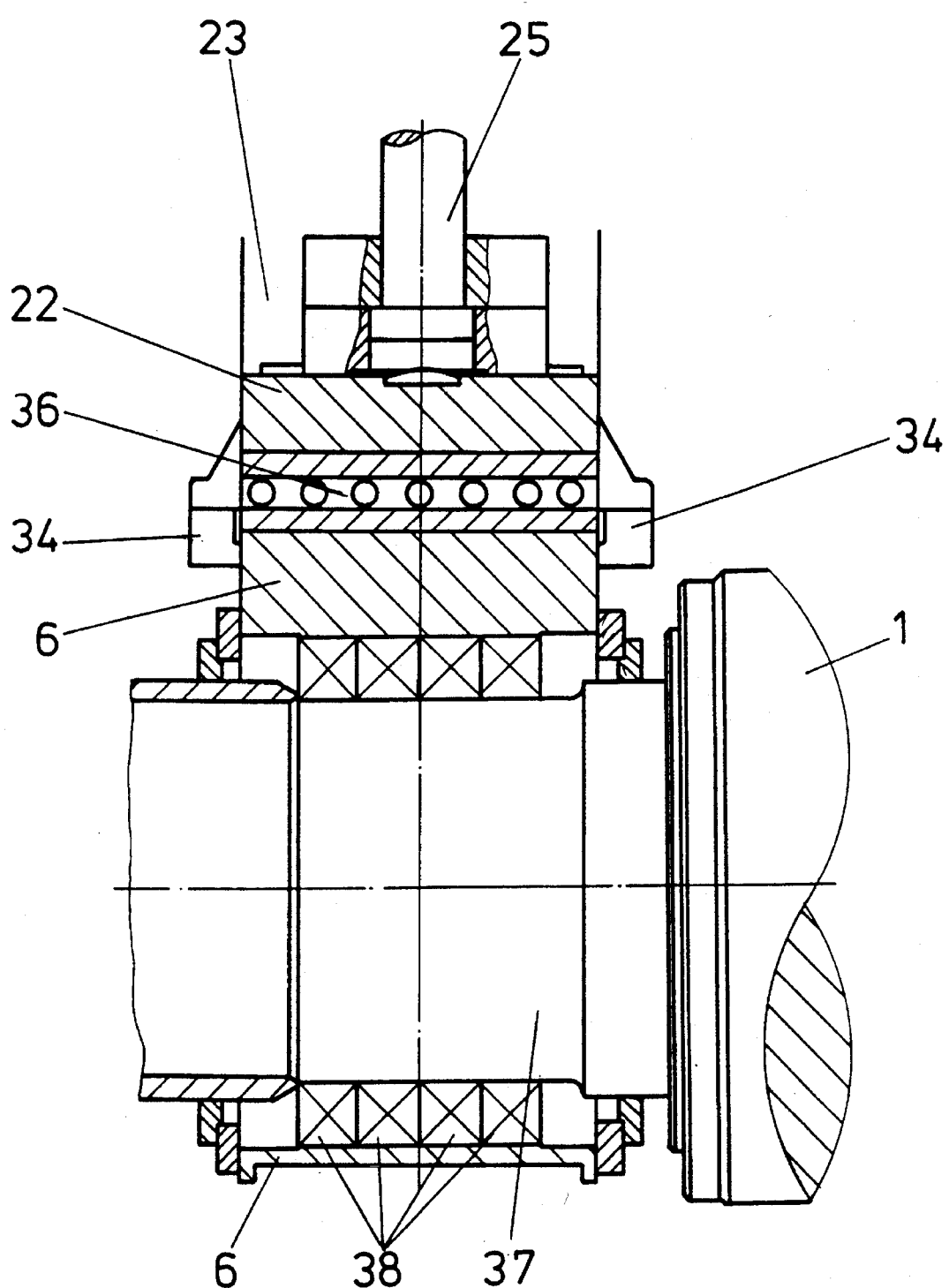
FIG. 4 is a fragmentary section view through the device illustrated in FIG. 3.

In the embodiment example of FIG. 2, the adjusting means 24 for roll crossing and shifting of roll 1 are secured in the calender frames 5, and the bearing housings 6 are displaceable clamped between the adjusting means. This allows the supports 22 to be made smaller and lighter. This form of realization is illustrated structurally in FIGS. 3 and 4.

In this form of realization, the bearing housing 6 is clamped by two guide jaws 32, which are kept under tension and displaced by displacing means 26. The bearing housing 6 is made concave in the region of the engaging guide jaws, while the guide jaws are convex with the same radius, so that they permit a rotation of the bearing housing 6 in a certain angular range necessary for roll crossing. The axis of these convex and concave faces 33 is parallel to the axis of the adjusting device 25. It is thereby possible, without adjustment of the adjusting means 26, to shift the bearing housing through the adjusting means 25.

The bearing housing 6, through which passes the roll journal 37 with the rolling bearings 38, is coupled to the adjusting means 25 via guides in the form of hooks 34 engaging in grooves 35 and is shiftable parallel to guide 8. A flat roller beating 36 facilitates the displacement of the bearing housing 6 under the considerable loads of the gap pressure. This flat bearing 36 here takes over the function of guide 30.

Figure 5:
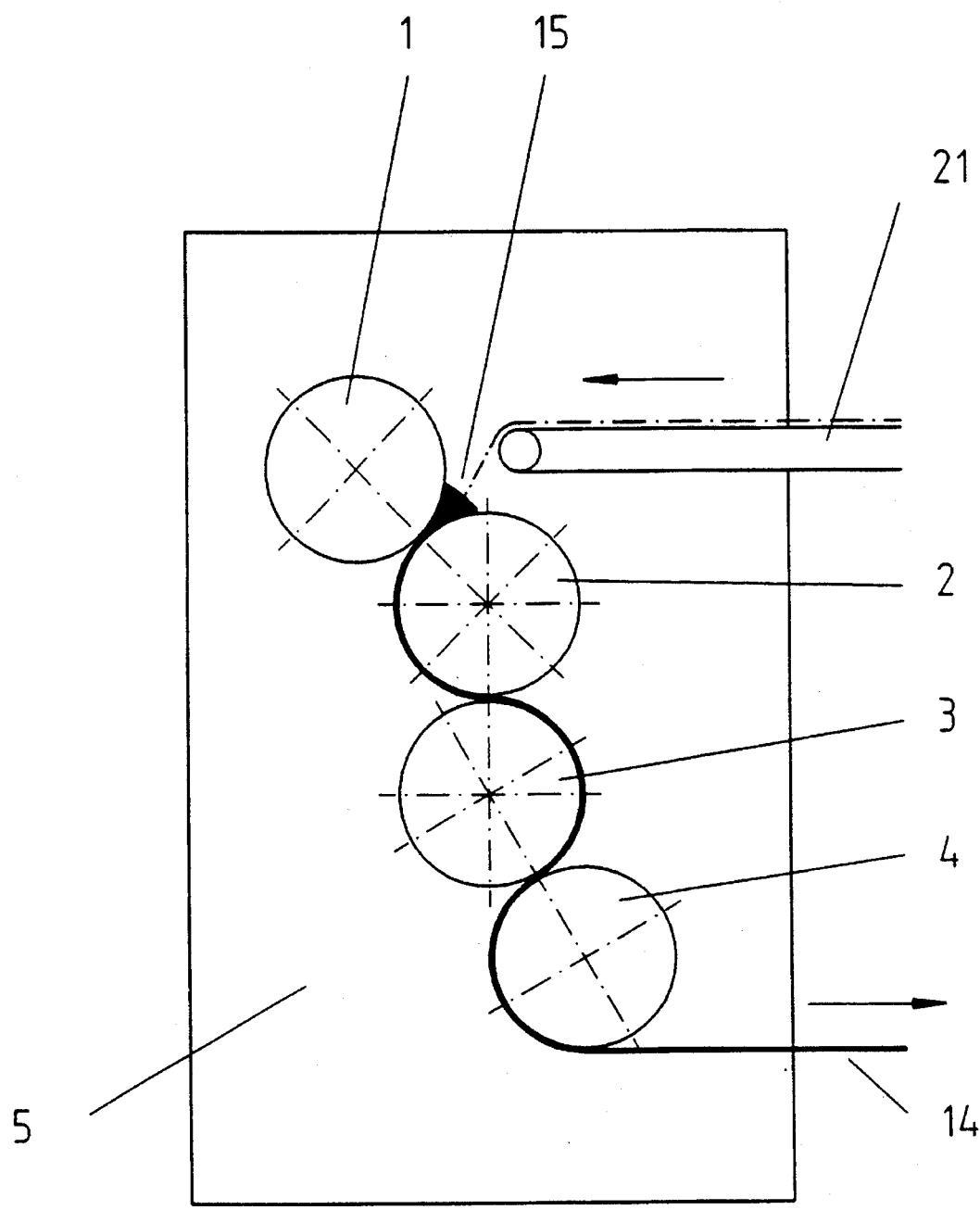
FIG. 5 illustrates the calender for producing a thin strip.
Figure 6:
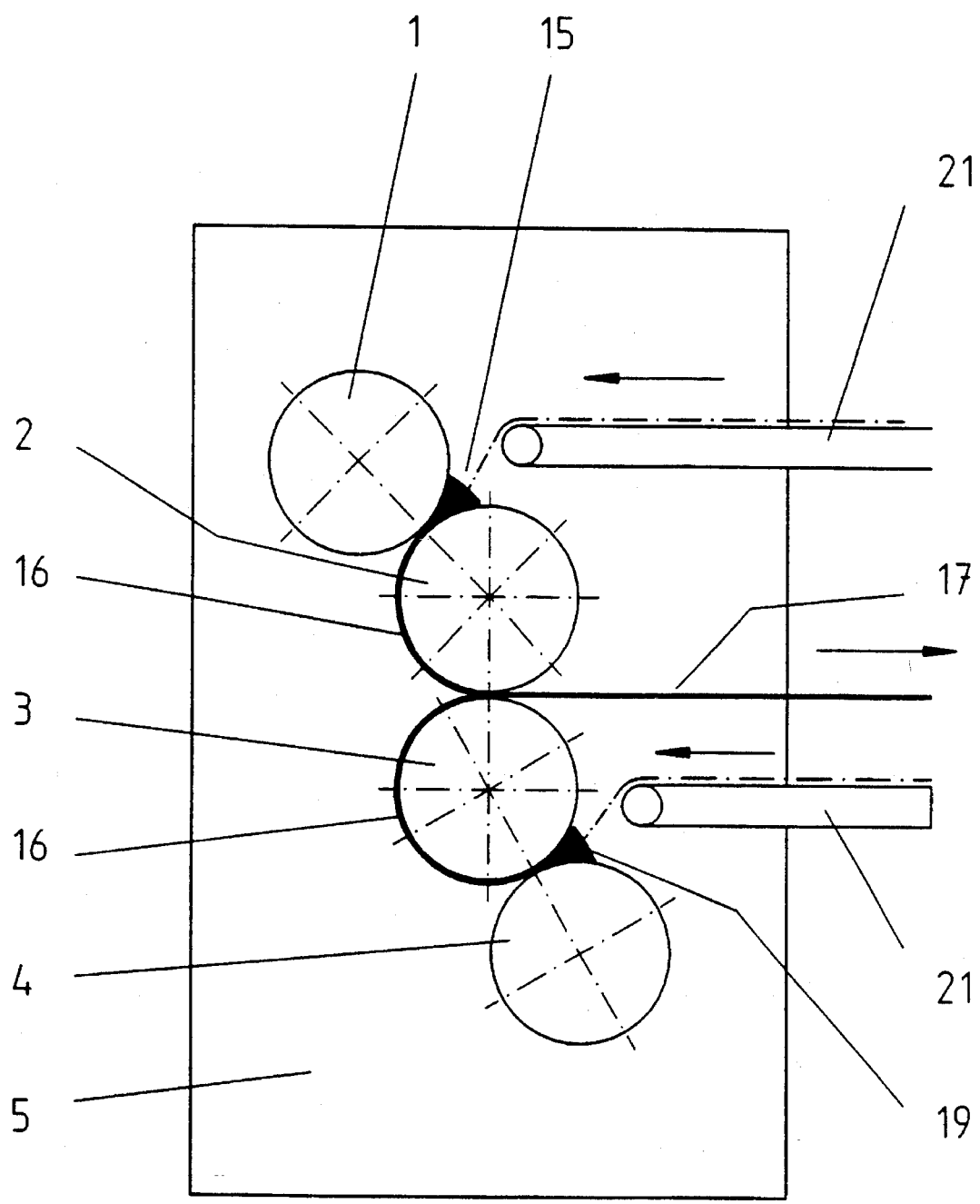
FIG. 6 illustrates the calender for doubling two sheets.
Figure 7:
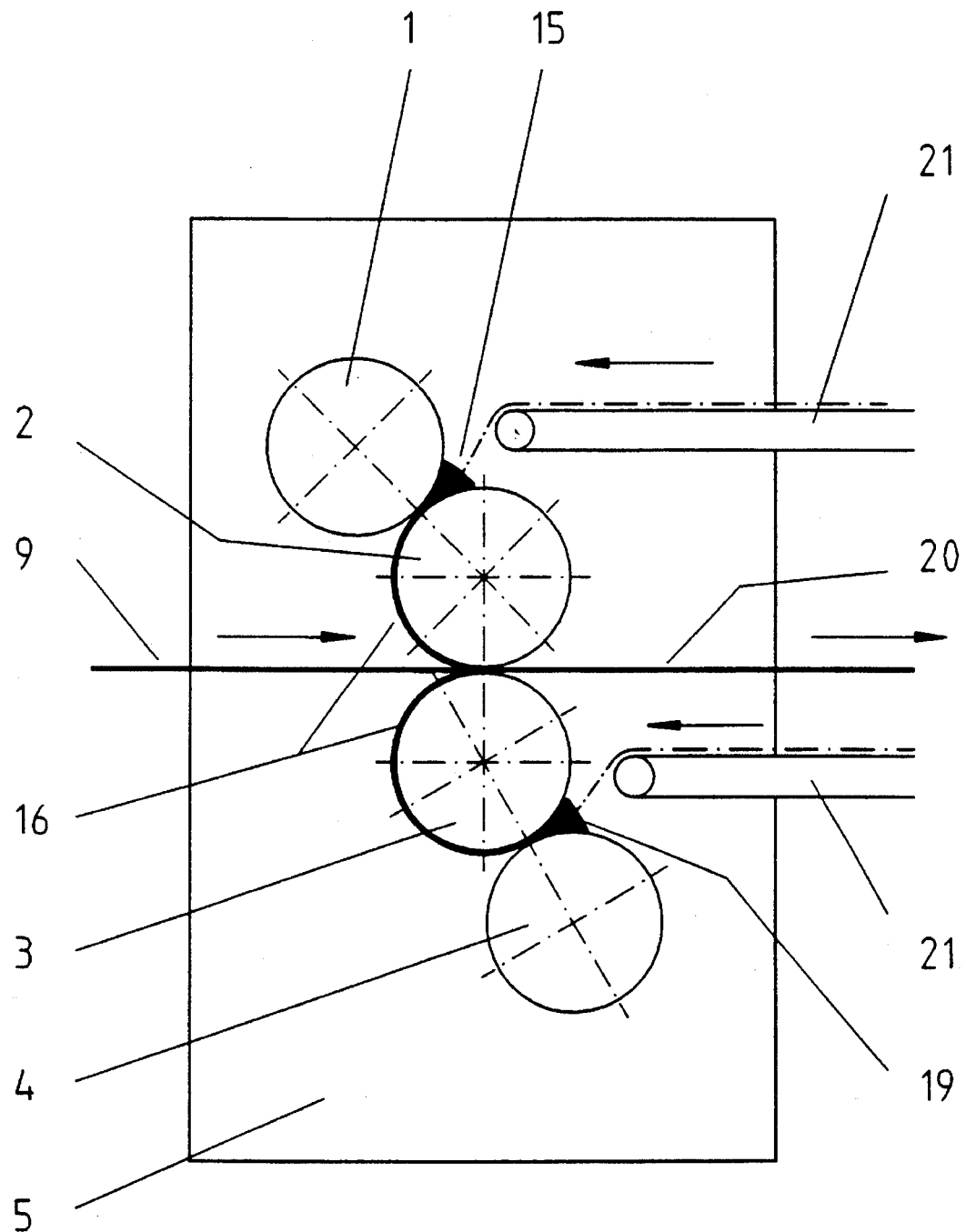
FIG. 7 illustrates the calender for coating a centrally fed sheet or fabric with a rubber layer on both sides.

The calender is, as FIG. 5 shows, suitable both for calendering a strip type product 14 in three gaps, the material 15 to be processed being fed by a belt conveyor 21 into the gap between rolls 1 and 2, as well as for the doubling of two sheets 16 produced from the material batches 15 and 19, fed by two conveyors 21, to a product 17 as shown in FIG. 6. Another use is shown in FIG. 7. Here, too, in a gap between rolls 2 and 3, sheets 16 produced out of the material batches 15 and 19 are placed or backed onto a web or fabric 9 supplied at that point from outside. A uniform thickness product 20 is thus produced.

Figure 8:
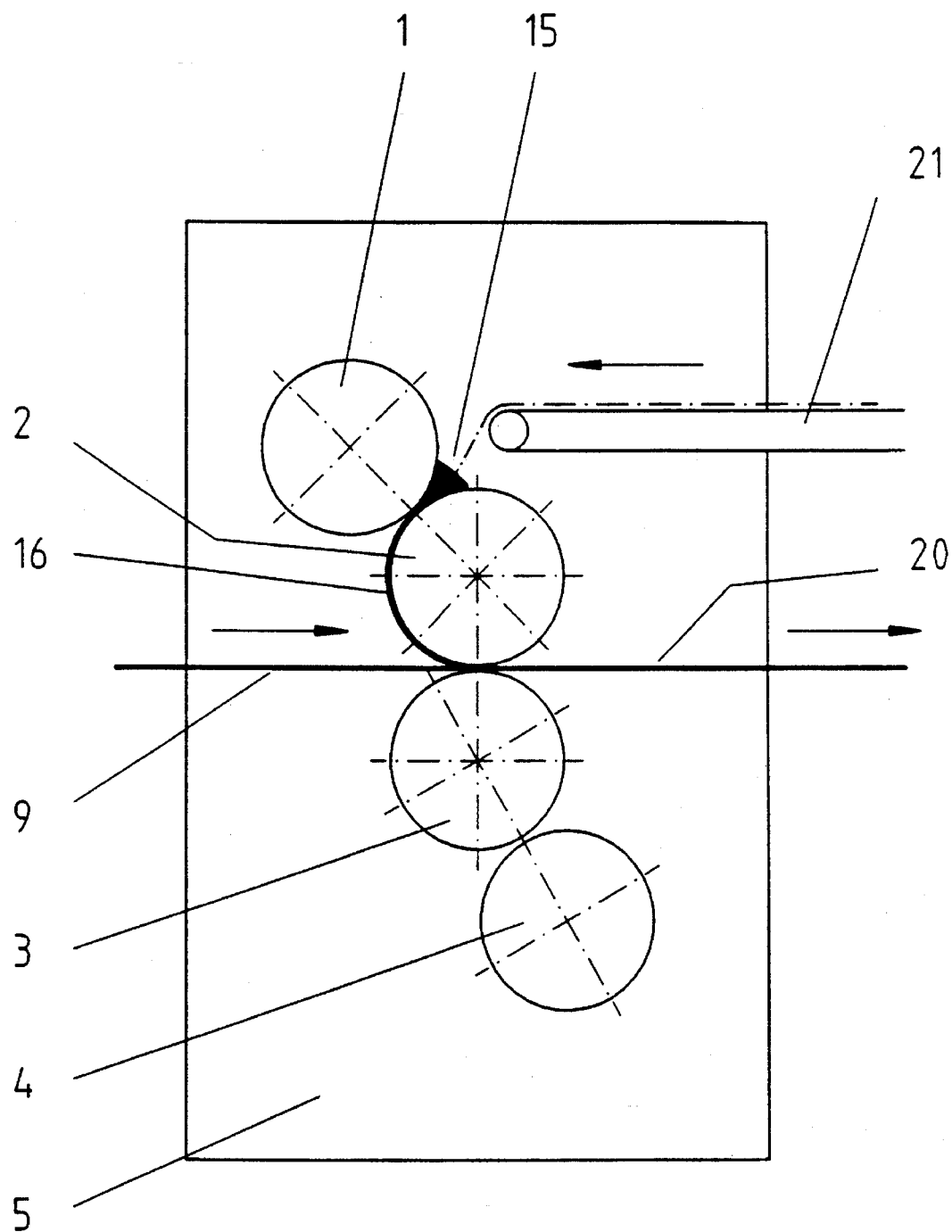
FIG. 8 illustrates the calender for unilateral frictioning of a centrally fed fabric.

FIG. 8 shows a further example of a use where a sheet produced from a material batch 15 is placed unilaterally on the supplied web or fabric 9 or is frictioned.

Figure 9:
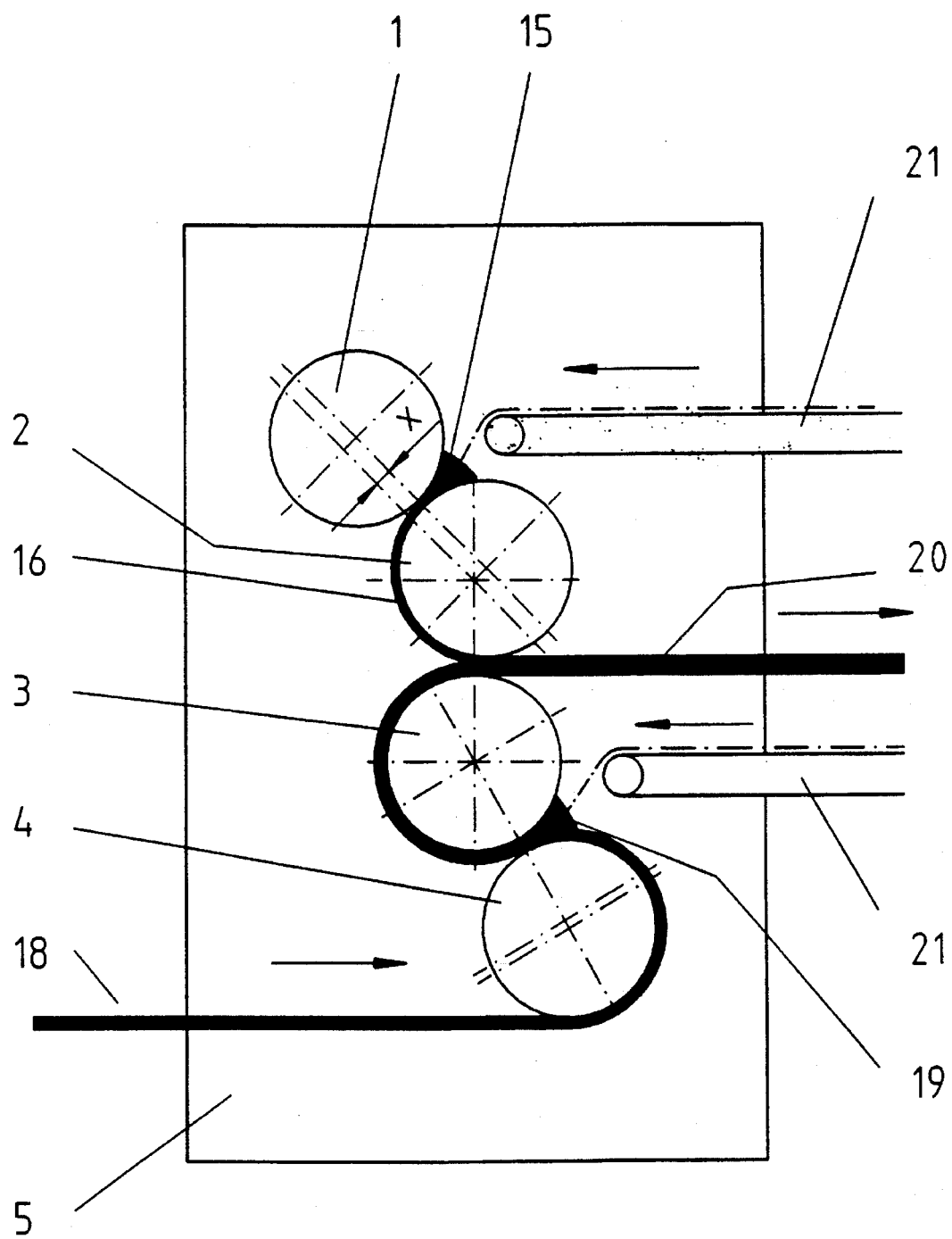
FIG. 9 illustrates the calender for bilateral coating or cladding of a sheet or fabric fed under the bottom roll.

FIG. 9 illustrates how a web or sheet 18 supplied under roll 4 is unilaterally coated or clad by a material batch 19 in the gap between rolls 3 and 4 fed by a lower belt conveyor 21. In the further passage of the web through the calender, its other side is coated in the gap between rolls 2 and 3 with a web or sheet 16 produced from a material batch 15 fed by an upper conveyor 21.

The invention thus achieves universal usability of the calender in a most simple manner by a certain arrangement and scaling of some structural parts of the calender, namely by the parallel arrangement of the shifting direction of the shiftable central roll to the shifting direction of the shiftable and crossable outer roll associated with it and by the possibility of parallel shifting of this outer roll over and above the possibility of crossing.

In this connection it is advantageous to provide two control possibilities for equal and preferably also uniform displacement of the two bearings of the outer roll associated with the slidable central roll:

A possibility of displacement of one beating in a counter-direction to the displacement of the other beating by equal path lengths to achieve the crossing and a further possibility of parallel displacement of both beatings in the same direction by equal path lengths.

I claim:

1. In a multi-purpose calender having a plurality of calender rolls mounted horizontally superposed extending in a common direction comprising four rotatably driven rolls consisting of two outer rolls and at least two coactive inner rolls intermediate the two outer rolls;

a first inner roll of said two inner rolls mounted rotatable about a horizontal axis of rotation fixed in a vertical and horizontal plane;

a shiftable second inner roll of said two inner rolls mounted rotatable about a horizontal axis of rotation and shiftable selectively to different positions constituting an end position in said vertical plane and other positions spaced away from said vertical plane in one direction and back to said end position for positioning said axis of rotation at said positions guided along a first inclined plane defining an acute angle relative to the horizontal and said vertical plane;

a crossable and shiftable first outer roll of said two outer rolls coactive with said second inner roll offset therewith mounted rotatable about a horizontal axis of rotation and crossable selectively along a second inclined plane parallel to said first inclined plane and the axis of rotation shiftable to different positions spaced along a third inclined plane defining an acute angle relative to said vertical plane and perpendicular to said second inclined plane;

a crossable and shiftable second outer roll of said two outer rolls coactive with said first inner roll offset therewith mounted rotatable about a horizontal axis crossable along a fourth inclined plane defining an acute angle relative to the horizontal and to said vertical plane and selectively shiftable to different positions along a fifth inclined plane defining an acute angle relative to said vertical plane and perpendicular to said fourth inclined plane; and means for selectively crossing and shifting of said crossable and shiftable rolls to provide a plurality of calender operational positions of the rolls for effecting different roll gaps therebetween for calender operations, including production of sheets, webs, coating of sheets and fabrics on one or both sides, doubling of webs, and production of foils and strips.

2. In a multi-purpose calender according to claim 1, in which said first outer roll is mounted above the second inner roll coactive therewith and offset therefrom.

3. In a multi-purpose calender according to claim 2, in which said second inner roll is mounted above said first inner roll.

4. In a multi-purpose calender according to claim 3, in which said second outer roll is mounted below said first inner roll coactive therewith and offset therefrom.

5. In a multi-purpose calender having a plurality of calender rolls mounted horizontally superposed extending in a common direction comprising four rotatably driven rolls consisting of two outer rolls and at least two coactive inner rolls intermediate the two outer rolls;

means for mounting a first inner roll of said two inner rolls rotatable about a horizontal axis of rotation fixed in a vertical and a horizontal plane;

means for mounting a shiftable second inner roll of said two inner rolls rotatable about a horizontal axis of rotation and shiftable selectively to different positions constituting an end position in said vertical plane and other positions spaced away from said vertical plane in one direction and back to said end position for positioning said axis of rotation at said positions guided along a first inclined plane defining an acute angle relative to the horizontal and said vertical plane;

means for mounting a crossable and shiftable first outer roll of said two outer rolls coactive with said second inner roll offset therewith rotatable about a horizontal axis of rotation and crossable selectively along a second inclined plane parallel to said first inclined plane, said means for mounting including guide means for guiding shifting of the first outer roll by guiding shifting of the axis of rotation to different positions spaced along a third inclined plane defining an acute angle relative to said vertical plane and perpendicular to said second inclined plane;

means for mounting a crossable and shiftable second outer roll of said two outer rolls coactive with said first inner roll offset therewith rotatable about a horizontal axis crossable along a fourth inclined plane defining an acute angle relative to the horizontal and to said vertical plane and selectively shiftable to different positions along a fifth inclined plane defining an acute angle relative to said vertical plane and perpendicular to said fourth inclined plane; and means for selectively crossing and shifting of said crossable and shiftable rolls to provide a plurality of calender operational positions of the rolls for effecting different roll gaps for calender operations, including production of sheets, coating of webs on one or both sides, doubling of sheets, and production of foils and strips.

6. In a multi-purpose calender having a plurality of calender rolls mounted horizontally superposed extending in a common direction comprising four rotatably driven rolls consisting of two outer rolls and at least two coactive inner rolls intermediate the two outer rolls;

means for mounting a first inner roll of said two inner rolls rotatable about a horizontal axis of rotation fixed in a vertical and a horizontal plane;

means including guide means for mounting a shiftable second inner roll of said two inner rolls rotatable about a horizontal axis of rotation and shiftable selectively to different positions constituting an end position in said vertical plane and other positions spaced away from said vertical plane in one direction and back to said end position for positioning said axis of rotation at said positions guided along a first inclined plane defining an acute angle relative to the horizontal and said vertical plane;

means including guide means for mounting a crossable and shiftable first outer roll of said two outer rolls coactive with said second inner roll offset therewith rotatable about a horizontal axis of rotation and crossable selectively along a second inclined plane parallel to said first inclined plane, said guide means including guide means for guiding shifting of the first outer roll by guiding shifting of the axis of rotation to different positions spaced along a third inclined plane defining an acute angle relative to said vertical plane and perpendicular to said second inclined plane;

means including guide means for mounting a crossable and shiftable second outer roll of said two outer rolls coactive with said first inner roll offset therewith rotatable about a horizontal axis crossable along a fourth inclined plane defining an acute angle relative to the horizontal and to said vertical plane and selectively shiftable guided by said guide means to different positions along a fifth inclined plane defining an acute angle relative to said vertical plane and perpendicular to said fourth inclined plane;

a plurality of separate means for selectively and variably crossing independently said first inner roll, said first outer roll and said second outer roll; and separate means for variably positioning said first outer roll, said second outer roll and said second outer roll at respective positions along respective inclined planes;

whereby selectively crossing and shifting of said crossable and shiftable rolls provides a plurality of calender operational positions of the rolls for effecting different roll gaps for calender operations, including production of sheets, coating of webs on one or both sides, doubling of sheets, and production of foils and strips.

7. A multi-purpose calender according to claim 6, in which each means for mounting an individual roll of three of said four rolls rotatably comprises for each roll respective bearing housings for a corresponding axis of rotation, and each said guide means of individual rolls guides displacement of a corresponding bearing housings along the respective inclined planes, and the bearing housings of said first inner roll being fixed in position on the calender.

8. In a multi-purpose calender according to claim 6, two laterally spaced end frames disposed on opposite ends of the calender; said end frames comprising said means including guide means for mounting said first outer roll, and said means including guide means for mounting said second outer roll.

9. In a multi-purpose calender according to claim 6, in which said end frames comprise slots having supports therein comprising said means including guide means for mounting individually the shiftable rolls.

10. In a multi-purpose calender according to claim 6, including two end frames on opposite ends of the calender, said frames having slots, bearing housings in said slots having bearings rotatably mounting respective rolls and comprising means including guides for mounting the crossable and shiftable rolls; and said means for variably crossing respective rolls and said means for crossing and shifting respective rolls displace said beating housings in said slots to effect positioning of corresponding rolls on the inclined planes at respective positions and to effect the crossing thereof.

* * * * *